United States Patent
Duffy et al.

(10) Patent No.: US 10,520,035 B2
(45) Date of Patent: Dec. 31, 2019

(54) VARIABLE VOLUME BEARING COMPARTMENT

(71) Applicant: United Technologies Corporation, Farmington, CT (US)

(72) Inventors: Kevin Duffy, Hartford, CT (US); Anthony Spagnoletti, Newington, CT (US)

(73) Assignee: United Technologies Corporation, Farmington, CT (US)

( * ) Notice: Subject to any disclaimer, the term of this patent is extended or adjusted under 35 U.S.C. 154(b) by 474 days.

(21) Appl. No.: 15/343,486

(22) Filed: Nov. 4, 2016

(65) Prior Publication Data

US 2018/0128319 A1    May 10, 2018

(51) Int. Cl.
| | |
|---|---|
| *F16C 33/76* | (2006.01) |
| *F16C 35/04* | (2006.01) |
| *F01D 25/16* | (2006.01) |
| *F02C 7/06* | (2006.01) |
| *F16C 33/72* | (2006.01) |

(52) U.S. Cl.
CPC .......... *F16C 33/766* (2013.01); *F01D 25/162* (2013.01); *F16C 35/04* (2013.01); *F05D 2220/32* (2013.01); *F16C 2360/23* (2013.01)

(58) Field of Classification Search
CPC ...... F16C 33/766; F16C 33/726; F16C 35/04; F16C 2360/23; F01D 25/16; F01D 25/162; F02C 7/06; F05D 2220/32; F05D 2260/605
See application file for complete search history.

(56) References Cited

U.S. PATENT DOCUMENTS

| | | | | |
|---|---|---|---|---|
| 2,672,010 A | * | 3/1954 | Newcomb | F01D 25/20 184/6.13 |
| 2,749,087 A | | 6/1956 | Blackman et al. | |
| 3,312,448 A | | 4/1967 | Hull, Jr. et al. | |
| 3,528,241 A | | 9/1970 | Venable et al. | |
| 4,452,037 A | * | 6/1984 | Waddington | F01D 25/18 184/6.11 |
| 4,475,735 A | * | 10/1984 | Smuda | F16J 15/40 277/350 |
| 4,497,172 A | * | 2/1985 | Smith | F01D 11/06 184/6.11 |

(Continued)

FOREIGN PATENT DOCUMENTS

| | | |
|---|---|---|
| EP | 1316678 A2 | 6/2003 |
| EP | 2977566 A1 | 1/2016 |

(Continued)

OTHER PUBLICATIONS

Extended European Search Report, for European Patent Application No. 17189123.7, dated Mar. 26, 2018, 7 pages.

*Primary Examiner* — Jason D Shanske
*Assistant Examiner* — Eric J Zamora Alvarez
(74) *Attorney, Agent, or Firm* — Kinney & Lange, PA (57) ABSTRACT

A bearing compartment assembly includes a bearing compartment with a bearing and a plenum, a buffer system that supplies pressure to an exterior of the bearing compartment, and a reactive volume vessel connected to the bearing compartment. The reactive volume vessel has a displaceable member that is movable between two positions, one of which adds additional volume to the bearing compartment.

12 Claims, 7 Drawing Sheets

(56) References Cited

U.S. PATENT DOCUMENTS

| | | | |
|---|---|---|---|
| 6,129,246 A * | 10/2000 | Metzler | B65G 53/4633 |
| | | | 222/189.11 |
| 6,470,666 B1 | 10/2002 | Przytulski et al. | |
| 6,516,618 B1 | 2/2003 | Bock | |
| 7,377,110 B2 | 5/2008 | SHeridan et al. | |
| 7,584,619 B2 * | 9/2009 | Granitz | F01D 25/20 |
| | | | 184/6.4 |
| 8,366,382 B1 * | 2/2013 | Muldoon | F01D 11/02 |
| | | | 415/111 |
| 8,529,200 B2 | 9/2013 | Pakkala et al. | |
| 8,572,974 B2 * | 11/2013 | Veilleux, Jr. | F02C 7/222 |
| | | | 60/39.08 |
| 9,022,390 B2 | 5/2015 | Amador | |
| 10,082,077 B2 * | 9/2018 | Denman | F01D 25/20 |
| 2013/0039739 A1 | 2/2013 | Milne et al. | |
| 2014/0069743 A1 * | 3/2014 | Xu | F01D 25/18 |
| | | | 184/6.11 |
| 2014/0144121 A1 | 5/2014 | Legare et al. | |
| 2014/0144154 A1 | 5/2014 | Legare et al. | |
| 2014/0271118 A1 * | 9/2014 | Junod | F02C 7/06 |
| | | | 415/1 |
| 2014/0373939 A1 * | 12/2014 | Borlon | F01D 25/18 |
| | | | 137/215 |

FOREIGN PATENT DOCUMENTS

| | | |
|---|---|---|
| GB | 2119858 A | 11/1983 |
| GB | 2366842 A | 3/2002 |
| WO | WO2014/060860 A1 | 4/2014 |

* cited by examiner

VARIABLE VOLUME BEARING COMPARTMENT

STATEMENT OF GOVERNMENT INTEREST

This invention was made with government support under contract FA8650-15-D-2502-0002 awarded by the United States Air Force. The United States government has certain rights in the invention.

BACKGROUND

The present invention relates generally to fluid systems, and more particularly to a pressurization system for a gas turbine engine.

There are a variety of known gas turbine engine configurations, including two-spool, high-bypass engines. Such an engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. A fan is also connected to the low pressure spool, forward of the low pressure compressor. The combustion system is disposed between the high pressure compressor and the high pressure turbine and receives compressed air from the compressors and fuel provided by a fuel injection system. A combustion process is carried out within the combustion system to produce high energy exhaust gases to produce thrust and turn the high and low pressure turbines, which drive their respective compressors and the fan to sustain the combustion process.

Because there are rotating components within the stationary components of a gas turbine engine, bearings are installed to promote smooth and efficient operation. Traditionally, the bearings are bathed in lubricating oil that is pumped into and scavenged out of the inside of the bearing compartment. The exterior of the bearing compartment is pressurized by an air buffer system to inhibit oil from inside of the compartment leaking outside of the compartment. There may be transient operational conditions where the air buffer system is not providing sufficient pressure to inhibit leakage from the bearing compartment.

SUMMARY

In one embodiment, a bearing compartment assembly includes a bearing compartment with a bearing and a plenum, a buffer system that supplies pressure to an exterior of the bearing compartment, and a reactive volume vessel connected to the bearing compartment. The reactive volume vessel has a displaceable member that is movable between two positions, and moving the displaceable member causes the total volume of the bearing compartment to change.

In another embodiment, a method of operating a bearing compartment assembly includes pressurizing an exterior of the bearing compartment and pressurizing a plenum inside a bearing compartment. In addition, the exterior pressure and the plenum pressure are changed, and the volume of the plenum in increased to prevent the buffer pressure from decreasing below the plenum pressure.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
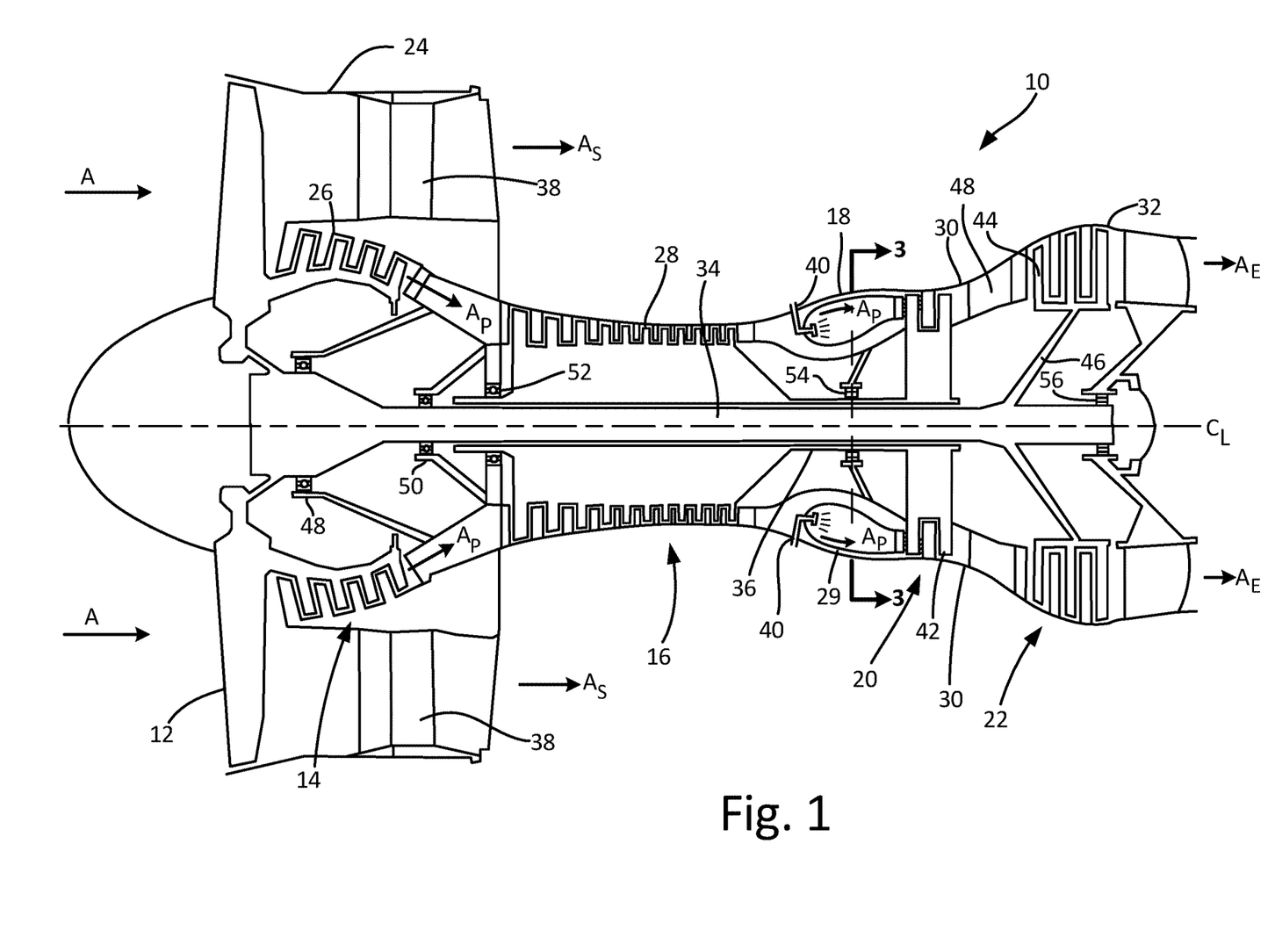
FIG. 1 is a schematic cross-sectional view of a gas turbine engine.

FIG. 1 is a schematic side cross-sectional view of gas turbine engine 10 for an aircraft (not shown). Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, combustor case 29, HPT case 30, LPT case 32, low pressure shaft 34, high pressure shaft 36, fan exit guide vanes 38, fuel injectors 40, HPT blades 42, LPT blades 44, support rotor 46, first bearing compartment 48, second bearing compartment 50, third bearing compartment 52, fourth bearing compartment 54, fifth bearing compartment 56, inlet air A, exhaust air $A_E$, primary air $A_P$, secondary air $A_S$ (also known as bypass air), and longitudinal engine centerline axis $C_L$.

In the illustrated embodiment, gas turbine engine 10 comprises a dual-spool turbofan engine, although other engine configurations are possible in alternative embodiments. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, combustor case 29, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally increase the pressure of primary air $A_P$. HPC 16 is rotated by HPT 20 through high pressure shaft 36 to provide primary air $A_P$ to combustor section 18. The compressed air is delivered to combustor section 18, along with fuel through fuel injectors 40, such that this fuel-air mixture is ignited by ignitors (not shown) thus resulting in a combustion process which can be carried out to produce the high energy gases necessary to turn HPT 20 and LPT 22. These high energy gases continue through gas turbine engine 10 whereby they are typically passed through an exhaust nozzle (not shown) to further produce thrust.

After being compressed in LPC 14 and HPC 16 and participating in a combustion process in combustor section 18 to increase pressure and energy, primary air $A_P$ is mixed with fuel in the combustor section 18. This fuel-air mixture is ignited by ignitors (not shown) and burned in the combustor section 18 producing exhaust air $A_E$. Exhaust air $A_E$ flows through HPT 20 and LPT 22 such that HPT blades 42 and LPT blades 44 extract energy from the flow of exhaust air $A_E$. Exhaust air $A_E$ impinges on HPT blades 42 to cause rotation of high pressure shaft 36, which turns HPC 16. Exhaust air $A_E$ also impinges on LPT blades 44 to cause rotation of support rotor 46 and low pressure shaft 34, which turns fan 12 and LPC 14.

In order to provide stability for and reduce the friction of the rotating components of gas turbine engine 10, several bearings are installed in bearing compartments that are positioned between the rotating components and the static components. More specifically, first bearing compartment 48 supports fan 12, second bearing compartment 50 and fifth bearing compartment 56 support low pressure shaft 34, and third bearing compartment 52 and fourth bearing compartment 54 support high pressure shaft 36.

Depicted in FIG. 1 is one embodiment of the present invention, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate compressor is connected to the intermediate turbine with an additional intermediate shaft such that low pressure shaft, intermediate shaft and high pressure shaft are each concentrically and coaxially disposed around longitudinal engine centerline axis $C_L$.

Figure 2:
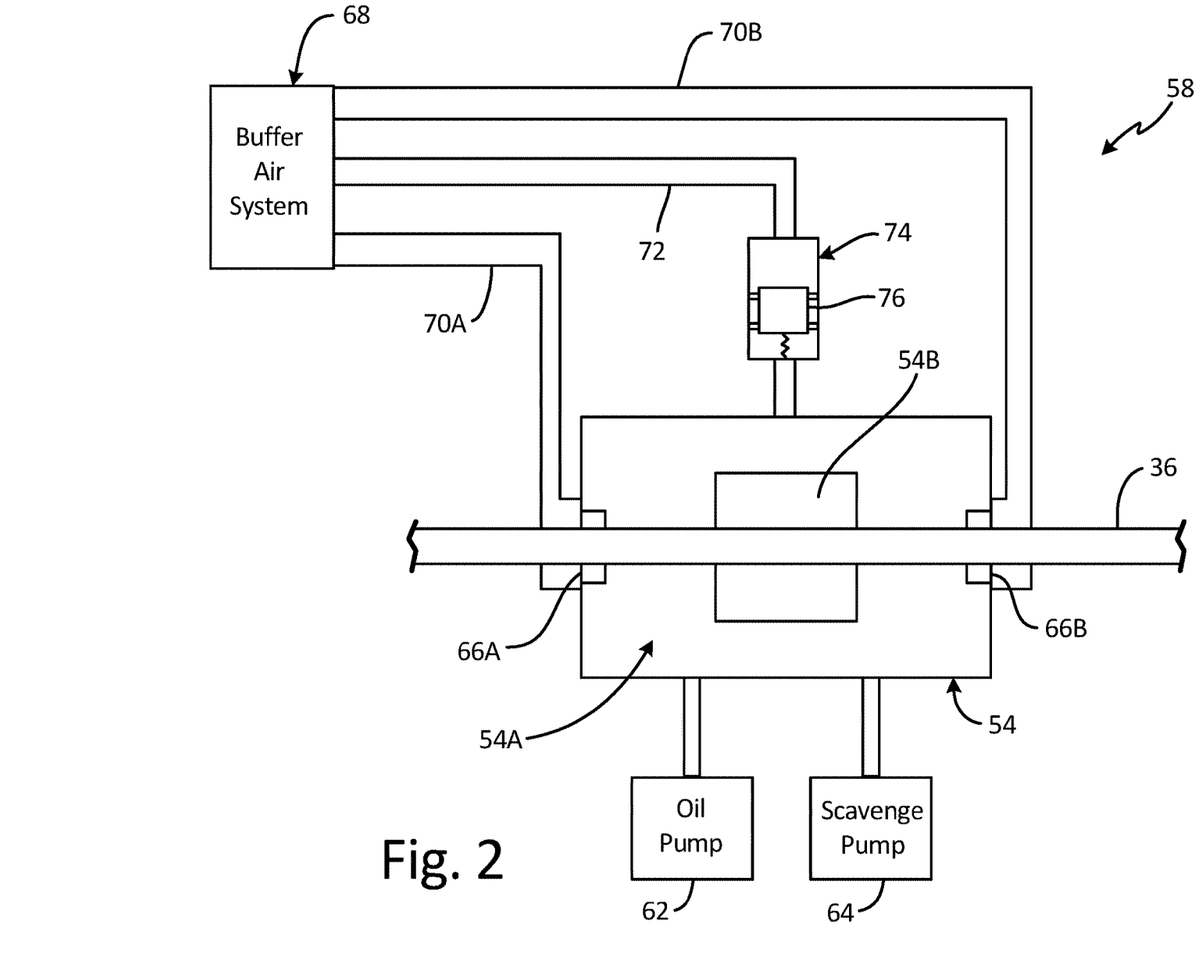
FIG. 2 is a schematic view of a bearing compartment assembly from the gas turbine engine of FIG. 1.

FIG. 2 is a schematic view of bearing compartment assembly 58 from gas turbine engine 10 (shown in FIG. 1). Bearing compartment assembly 58 includes fourth bearing compartment 54 which supports high pressure shaft 36. In alternate an embodiment, bearing compartment assembly 58 can include any one of first bearing compartment 48, second bearing compartment 50, third bearing compartment 52, and fifth bearing compartment 56, each of which support a corresponding rotating component.

In the illustrated embodiment, fourth bearing compartment 54 is a capped compartment that has an enclosed plenum 54A that surrounds a bearing 54B, into which pressurized oil is fed from oil pump 62 and drained by scavenge pump 64. Because high pressure shaft 36 passes through bearing compartment 54, bearing compartment 54 includes shaft seals 66A and 66B that are positioned at the exterior of bearing compartment 54 and in contact with high pressure shaft 36. Due to the motion of various components inside of bearing compartment 54, an air/oil mixture is present in plenum 54A of bearing compartment 54.

The exterior of bearing compartment 54 is pressurized by air buffer system 68 which receives compressed air from one of LPC 14 and HPC 16 (shown in FIG. 1). Air buffer system 68 includes seal duct 70A which leads to shaft seal 66A and seal duct 70B which leads to shaft seal 66B. Air buffer system 68 further includes auxiliary duct 72 which is a tube, duct, and/or cavity. Auxiliary duct 72 is in fluid communication with one side of reactive volume vessel (RVV) 74. The opposite side of RVV 74 is also in fluid communication with bearing compartment 54, although RVV 74 has a displaceable member, piston 76, which substantially prevents flow between bearing compartment 54 and air buffer system 68 (except as noted below). The typical position of piston 76 is toward bearing compartment 54, although piston 76 can move away from bearing compartment 54, and in doing so, augments the volume of bearing compartment 54 by effectively adding to it.

During operation of gas turbine engine 10 (shown in FIG. 1), air buffer system 68 is configured to provide pressurized air against shaft seals 66A and 66B that is greater than the pressure inside of bearing compartment 54. Therefore, leakage of the oil inside of bearing compartment 54 through shaft seals 66A and 66B is discouraged. However, there are certain operational conditions of gas turbine engine 10 in which the pressure difference may reverse, such that the pressure inside bearing compartment 54 is greater than the pressure in buffer system 68. In the case of a pressure difference reversal, the pressure is insufficient to inhibit leakage. For example during a snap deceleration (e.g. during a rejected takeoff when gas turbine engine 10 goes from full power to idle in a short period of time), air buffer system 68 depressurizes faster than bearing compartment 54. Scavenge pump 64 is not suctioning the air/oil mixture out of bearing compartment 54 fast enough to prevent the pressure in air buffer system 68 from dropping below the pressure in bearing compartment 54. In such a situation, RVV 74 temporarily adds volume to bearing compartment 54, reducing the pressure therein. The action of piston 76 moving within RVV 74 can maintain a sufficient pressure differential between air buffer system 68 and bearing compartment 54.

Figure 3A:
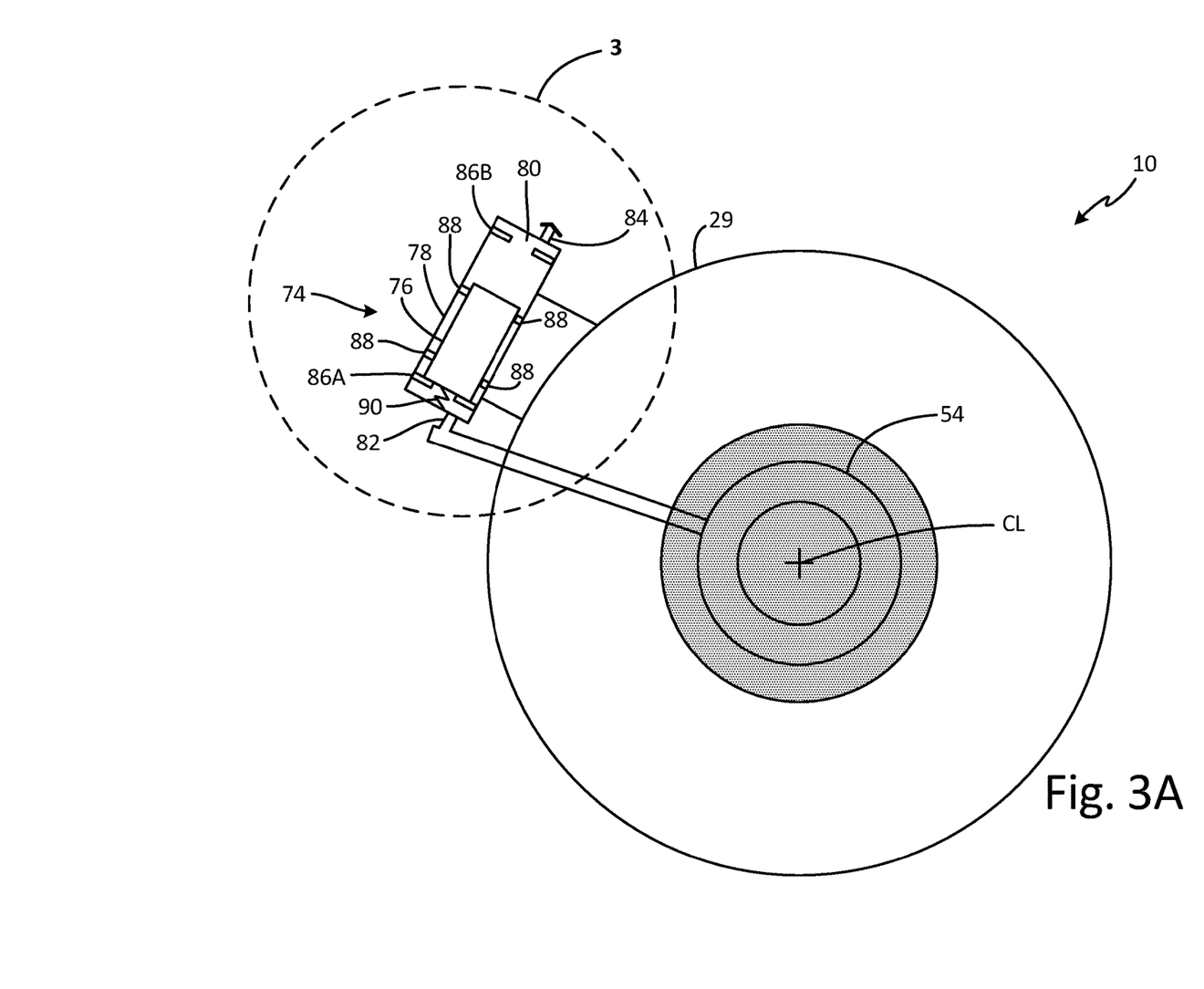
FIG. 3A is a schematic cross-sectional view of the gas turbine engine of FIG. 1 along line 3-3 including a reactive volume vessel in a standard volume position.

FIG. 3A is a schematic cross-sectional view of gas turbine engine 10 of FIG. 1 along line 3-3 including reactive volume vessel (RVV) 74 in a standard volume position. In the illustrated embodiment, RVV 74 is attached to combustor case 29 and is exterior to bearing compartment 54. RVV 74 comprises hollow housing 78 with cavity 80 inside. Housing 78 includes compartment port 82 which is in fluid communication with bearing compartment 54 and buffer port 84 which is in fluid connection to auxiliary duct 72. Housing further includes piston stops 86A and 86B which bound the movement of piston 76, which is also positioned in cavity

80. More specifically, piston stop 86A stops piston 76 in the standard volume position such that fluid from compartment port 82 can exert pressure on substantially all of the bottom end of piston 76 when piston 76 is in the standard volume position. Piston 76 includes piston seals 88 and is in contact with spring 90. Spring 90 is an elastic member that biases piston 76 into the additional volume position (i.e., spring 90 is compressed when piston 76 is in the standard volume position).

Figure 3B:
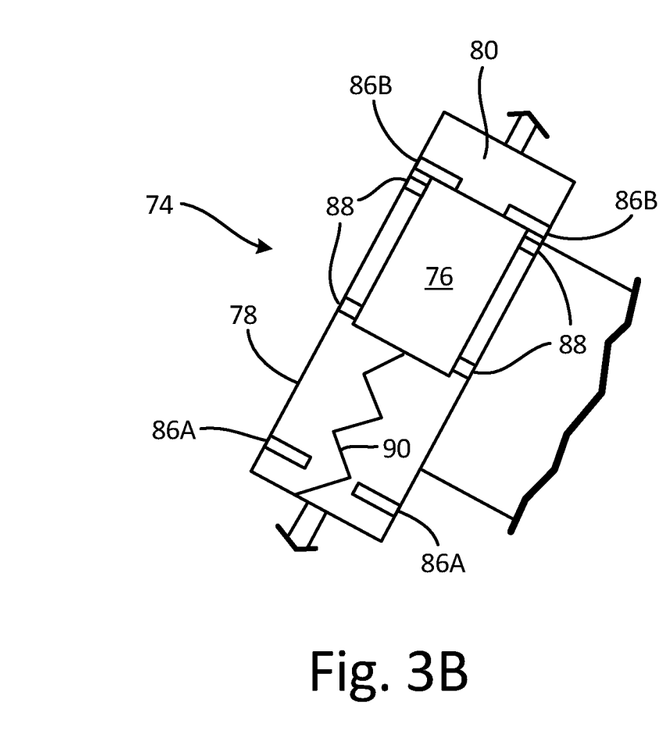
FIG. 3B is a close-up schematic cross-sectional view indicated by circle 3 in FIG. 3A of the reactive volume vessel in a maximum additional volume position.

FIG. 3B is a close-up schematic cross-sectional view indicated by circle 3 in FIG. 3A of RVV 74 in a maximum additional volume position. As depicted, piston 76 is resting against piston stop 86B in an additional volume position that provides the maximum additional volume that RVV 74 can provide. Piston stop 86B stops piston 76 in the maximum additional volume position while leaving substantially the entire top end of piston 76 exposed to the fluid from buffer port 84. This allows the fluid from buffer port 84 to exert force on substantially the entire top end of piston 76 when piston 76 is in the maximum additional volume position. Piston 76 would move into the maximum additional volume position when the pressure in air buffer system 68 (shown in FIG. 2) was sufficiently close to the pressure in bearing compartment 54. Because spring 90 biases piston 76 towards piston stop 86B, the pressure in air buffer system 68 would not need to be below the pressure in bearing compartment 54 for piston 76 to move into the maximum additional volume position. For this same reason, piston 76 rests in the maximum additional volume position when gas turbine engine 10 (shown in FIG. 1) is off because the pressure difference between air buffer system 68 and bearing compartment 54 is nil.

Figure 3C:
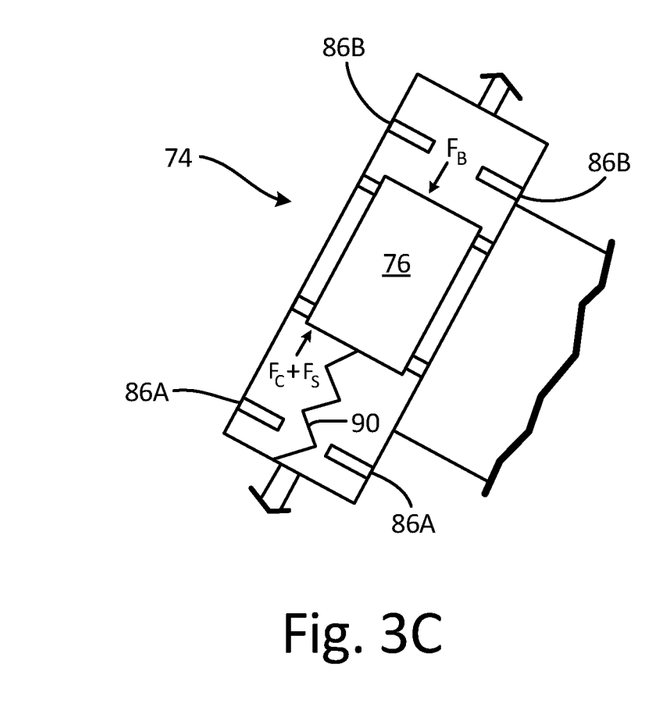
FIG. 3C is a close-up schematic cross-sectional view indicated by circle 3 in FIG. 3A of the reactive volume vessel in another additional volume position.

FIG. 3C is a close-up schematic cross-sectional view indicated by circle 3 in FIG. 3A of the RVV 74 in another additional volume position. As depicted, piston 76 is positioned between piston stops 86A and 86B. In this position, the force $F_B$ from the pressure of air buffer system 68 (shown in FIG. 2) is balanced with the force $F_C$ from the pressure of bearing compartment 54 plus the spring force $F_S$ from spring 90. In this position, RVV 74 provides additional volume to bearing compartment 54, but RVV 74 can provide more or less additional volume.

Referring now to FIGS. 3A-3C together, in one embodiment, the volume of bearing compartment is 2.0 L (120 cu. in.). Piston 76 has a diameter of 5.08 cm (2 in.) and an axial travel of 5.08 cm (2 in.) for a maximum additional volume of 0.10 L (6.28 cu. in.). The stiffness of spring 90 is 5.2 N/cm (3 lbf./in.) with an initial compression of 2.54 cm (1 in.) when piston 76 is in the maximum additional volume position.

During operation of gas turbine engine 10, air buffer system 68 (shown in FIG. 2) provides sufficient pressure to the top end of piston 76 to overcome both spring 90 and the pressure from bearing compartment 54, for example, 19 kPa (2.8 psi) more than the pressure of bearing compartment 54. In the event that the pressure difference between air buffer system 68 and bearing compartment 54 is reduced a significant amount, for example, less than 19 kPa (2.8 psi), piston 76 will be forced off of piston stop 86A and will move toward piston stop 86B (as shown in FIG. 3C). This movement effectively increases the volume of bearing compartment 54, reducing the pressure therein. For example, RVV 74 can maximally increase the volume of bearing compartment 54 by approximately 5%, which can accommodate a temporary pressure differential of 5%. In alternative embodiments, RVV 74 can maximally increase the volume of bearing compartment 54 between 0.5% and 20% or, more preferably, between 1% and 10%.

In the illustrated embodiment of FIGS. 3A-3C, RVV 74 has an at least partially vertical orientation and is positioned in the upper half of gas turbine engine 10. Such a configuration allows any oil that has been deposited in RVV 74 from the air/oil mixture inside bearing compartment 54 will drain out due to gravity during and after shutdown of gas turbine engine 10. To assist with this evacuation of RVV 74, piston seals 88 can be configured to allow a relatively small amount of air past piston 76 which further forces any oil present in RVV 74 back into bearing compartment 54.

Figure 4:
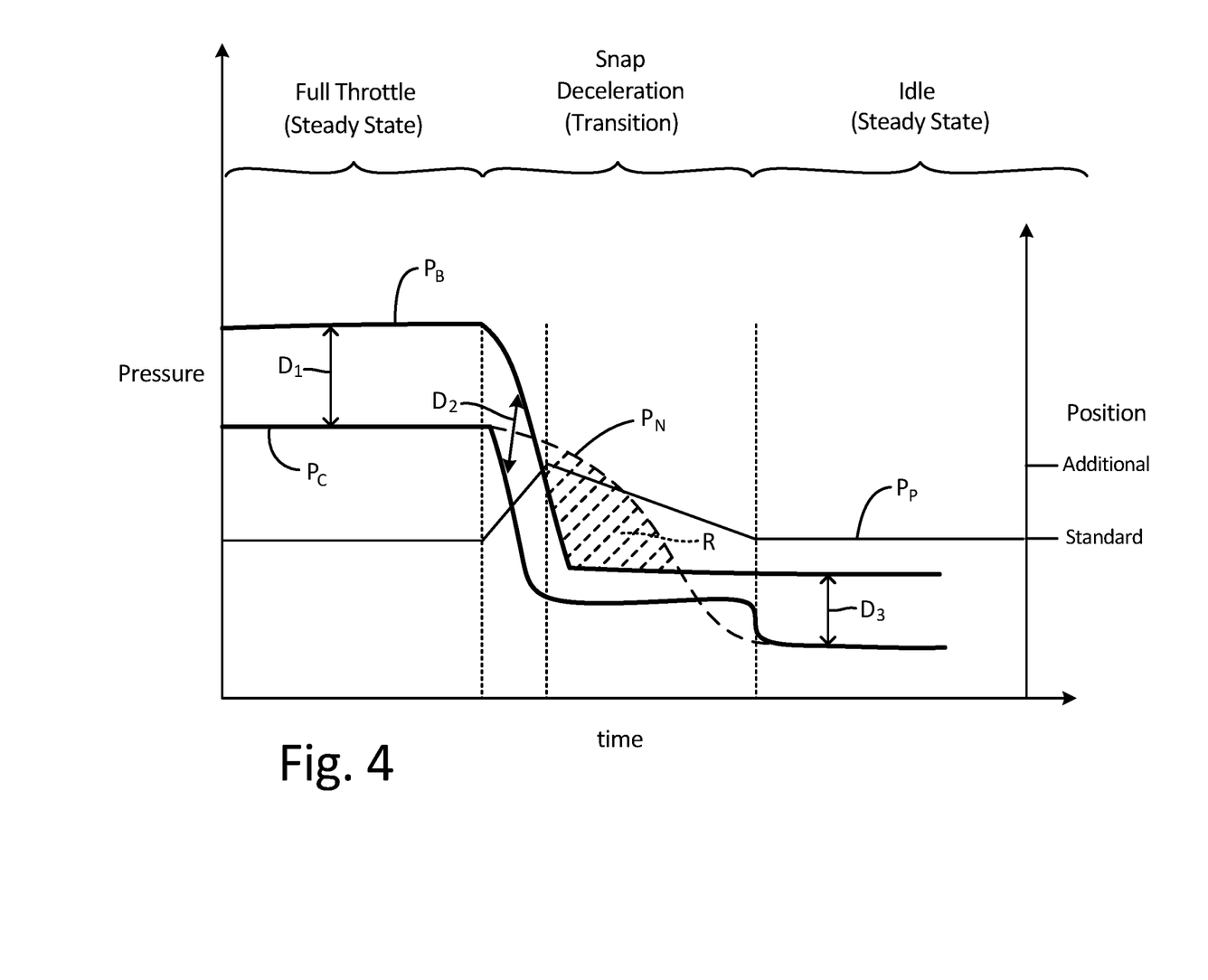
FIG. 4 is a graph of pressure versus time and position versus time for a bearing compartment and a reactive volume vessel of the bearing compartment assembly.

The chronological operation bearing compartment assembly 58 (shown in FIG. 2) can be shown graphically. FIG. 4 is a graph of pressure versus time and position versus time for bearing compartment 54 and reactive volume vessel (RVV) 74 of bearing compartment assembly 58. Plotted on the graph are pressure $P_C$ of bearing compartment 54, pressure $P_B$ of air buffer system 68, and position $P_P$ of piston 76. The graph in FIG. 4 shows the values of $P_C$, $P_B$, and Pp during a snap deceleration transition of gas turbine engine 10 (shown in FIG. 1) between a steady state, full throttle condition and a steady state, idle throttle condition. In addition, the graph includes pressure $P_N$. Pressure $P_N$ represents the behavior that $P_C$ would exhibit during the transition if the volume of bearing compartment 54 (shown in FIG. 2) were not augmented by RVV 74 (shown in FIG. 2).

In the illustrated graph, there is an initial difference $D_1$ in pressure between $P_B$ and $P_C$ which inhibits oil from leaking out of bearing compartment 54. As the engine throttle is rapidly reduced, pressure $P_B$ drops sharply although pressure $P_N$ drops more gradually. If RVV 74 is not present, then pressure $P_B$ can drop below pressure $P_N$ for a period of time that is indicated by region R. Region R represents a time at which air buffer system 68 (shown in FIG. 2) is not sufficiently inhibiting leakage of oil from bearing compartment 54.

However, during the transition, RVV 74 adds volume to bearing compartment 54. This reduces the pressure $P_C$ at a rate that is similar to or faster than the rate of pressure $P_B$, which preserves a positive pressure difference $D_2$ (albeit a smaller difference than D1). The reduced pressure difference $D_2$ means that the net fluid force on piston 76 that urges piston 76 against piston stop 86A (as shown in FIG. 3A) is also reduced. Spring 90 is configured to overpower this reduced fluid force (i.e., pressure $P_B$ minus pressure $P_C$), pushing piston 76 toward the additional volume position, as denoted by the rising position $P_P$. The addition of spring 90 to RVV 74 means that the volume of bearing compartment 54 is increased before pressure difference $D_2$ goes negative (which would occur with pressure $P_N$ during snap deceleration). In an alternative embodiment, piston 76 can be configured to have a larger surface area facing bearing compartment 54 than the surface area facing air buffer system 68 to ensure the same functionality.

At a point during the transition period, scavenge pump 64 (shown in FIG. 2) reduces the pressure in bearing compartment 54 enough that piston 76 begins returning to the standard volume position, as denoted by the falling position $P_P$. At the end of the transition, gas turbine engine 10 is in the steady state idle condition, in which the pressure difference $D_3$ between air buffer system 68 and bearing compartment 54 is greater than difference $D_2$, although lesser than difference $D_1$. Pressure difference $D_3$ is large enough to force piston 76 all of the way back to the standard volume position.

The addition of RVV 74 to bearing compartment assembly 58 allows air buffer system 68 to maintain a positive pressure differential over bearing compartment 54. This gives scavenge pump 64 more time to reduce pressure $P_C$, which allows scavenge pump 64 to be smaller than would otherwise be necessary to inhibit leakage of oil from bearing compartment 54 at all operating conditions in the absence of RVV 74.

Figure 5:
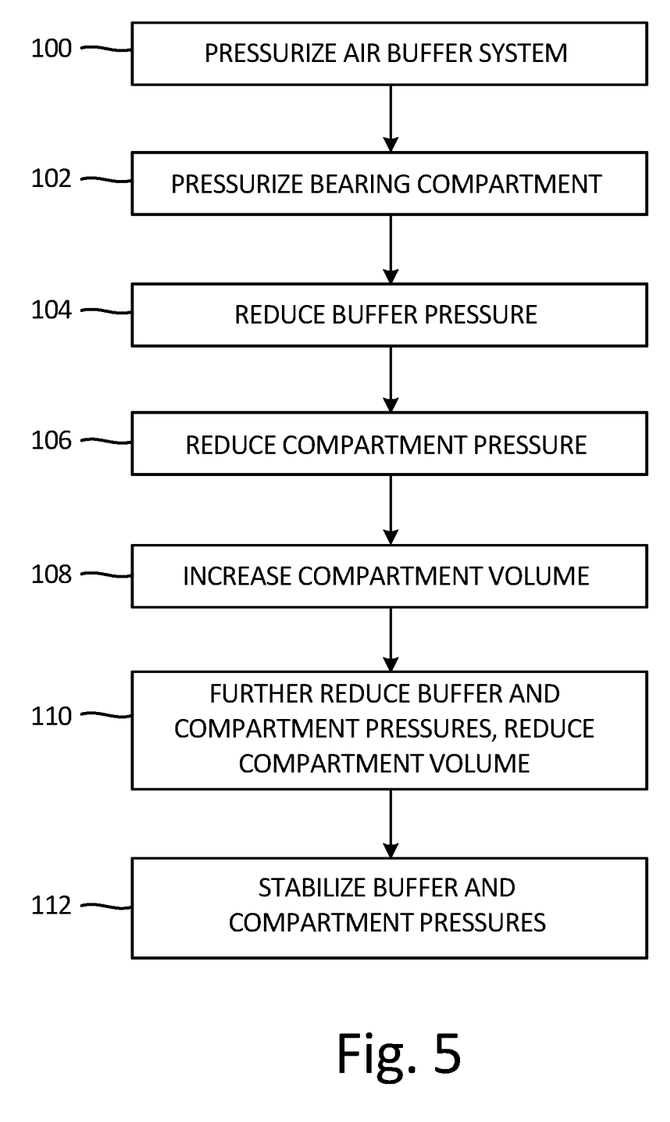
FIG. 5 is a flow chart of a method of pressurizing the bearing compartment assembly of FIG. 2.

FIG. 5 is a flow chart of a method of pressurizing bearing compartment assembly 58 of FIG. 2. Please note that the components used in the flow chart are illustrated in FIGS. 1-4.

At step 100, gas turbine engine 10 is at a steady state, full throttle condition. Shaft seals 66A and 66B are pressurized by air buffer system 68, and the bearing compartment is pressurized at step 102 by a balance of oil pump 62 and scavenge pump 64. At step 104, gas turbine engine 10 enters a transient, snap deceleration condition. Pressure $P_B$ of air buffer system 68 is reduced, and, substantially simultaneously, at step 106, pressure $P_C$ of bearing compartment 54 is reduced. At step 108, piston 76 moves from the standard volume position toward (or to) the additional volume position to increase the volume of bearing compartment 54. This reduces pressure $P_C$, preventing it from increasing substantially above pressure $P_B$. At step 110, pressures $P_B$ and $P_C$ continue to reduce at a relative rate that allows piston 76 to move back toward (or to) the standard volume position, decreasing the volume of bearing compartment 54. At step 112, gas turbine engine 10 enters a steady state, idle throttle condition in which pressures $P_B$ and $P_C$ are stabilized. Pressure $P_B$ is greater than pressure $P_C$, although by a difference that is smaller than the one in step 102 but greater than a difference at steps 108 and 110.

Figure 6:
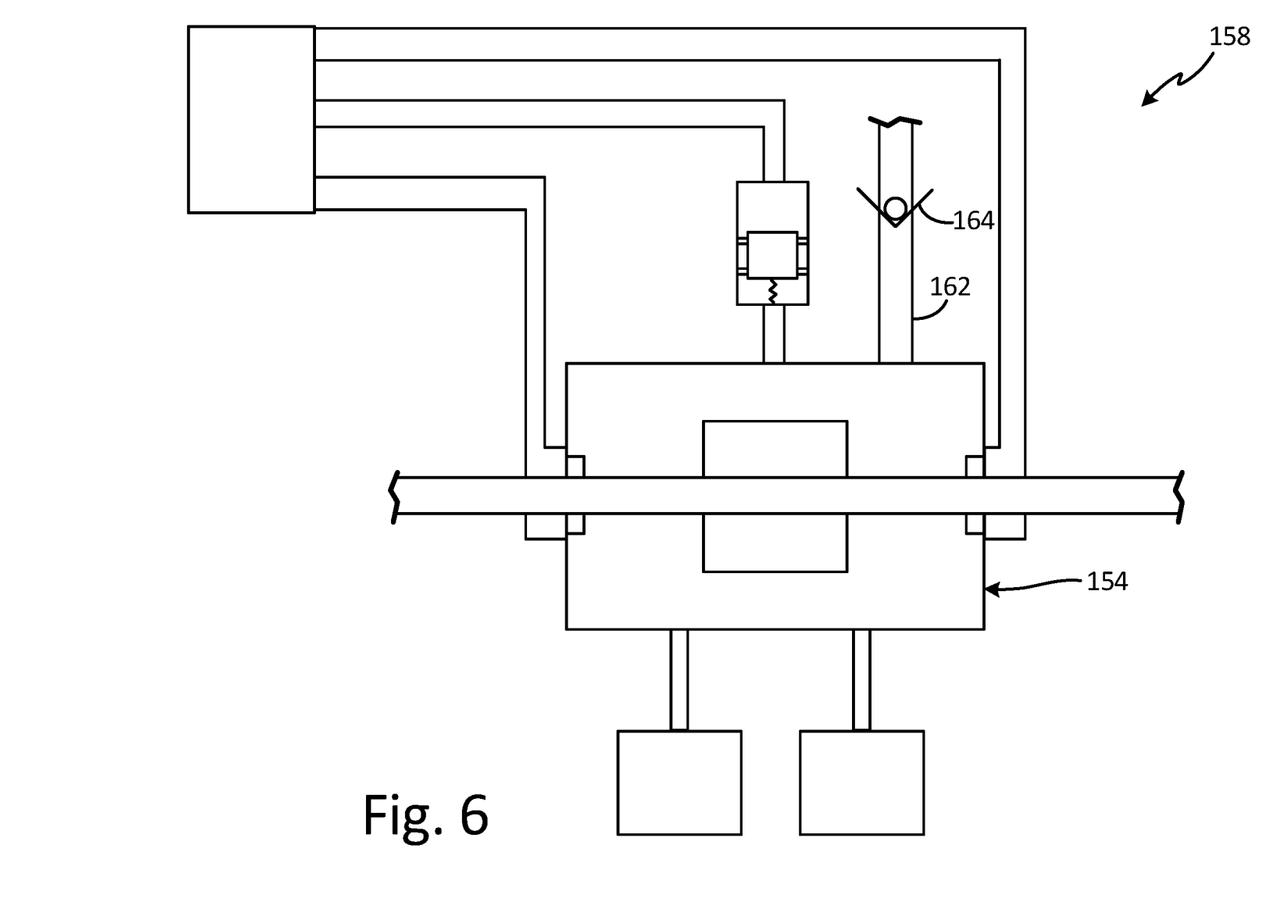
FIG. 6 is a schematic view of an alternate embodiment bearing compartment assembly.

FIG. 6 is a schematic view of an alternate embodiment bearing compartment assembly 158. Bearing compartment assembly 158 is similar to bearing compartment assembly 58 of FIG. 2. However, in the illustrated bearing compartment assembly 158, bearing compartment 154 further includes breather line 162 with check valve 164 that allows fluid to flow out of bearing compartment 154. Check valve 164 is configured to prevent fluid from being drawn into bearing compartment 154 through breather line 162 when piston 76 moves to an additional volume position (as shown in FIGS. 3B and 3C). Alternatively, check valve 164 can open at a slightly higher pressure differential, although not such a high pressure differential that check valve 164 would frequently be open.

During operation of gas turbine engine 10 (shown in FIG. 1), if the pressure differential between air buffer system 68 and bearing compartment 154 should drop far enough, then check valve 164 will prevent further dropping of the pressure difference. The relief of pressure from bearing compartment 154 via check valve 164 inhibits oil from overcoming the pressure of air buffer system 68, which inhibits leaking of oil through shaft seals 66A and 66B (shown in FIG. 2) or RVV 74.

Discussion of Possible Embodiments

The following are non-exclusive descriptions of possible embodiments of the present invention.

A bearing compartment assembly according to an exemplary embodiment of this disclosure, among other possible things includes: a bearing compartment comprising: a bearing; a plenum surrounding the bearing, the plenum having a plenum volume; a buffer system that supplies pressure to an exterior of the bearing compartment; and a reactive volume vessel that is in fluid communication with the plenum, the reactive volume vessel comprising a displaceable member that is movable between a standard volume position and an additional volume position, wherein the reactive volume vessel adds an additional volume to the plenum volume when the displaceable member is in the additional volume position.

The bearing compartment assembly of the preceding paragraph can optionally include, additionally and/or alternatively, any one or more of the following features, configurations and/or additional components:

A further embodiment of the foregoing bearing compartment assembly, wherein the reactive volume vessel can be in fluid communication with the buffer system.

A further embodiment of any of the foregoing buffer assemblies, wherein a first side of the displaceable member can be fluidly exposed the plenum and a second side of the displaceable member can be fluidly exposed to the buffer system.

A further embodiment of any of the foregoing buffer assemblies, wherein the bearing compartment assembly can further comprise: an elastic member that biases the displaceable member toward the additional volume position.

A further embodiment of any of the foregoing buffer assemblies, wherein the displaceable member can be a piston.

A further embodiment of any of the foregoing buffer assemblies, wherein the bearing compartment assembly can further comprise: a seal positioned between the piston and a housing of the reactive volume vessel.

A further embodiment of any of the foregoing buffer assemblies, wherein the bearing compartment assembly can further comprise: a spring that biases the piston toward the additional volume position.

A further embodiment of any of the foregoing buffer assemblies, wherein the bearing compartment assembly can further comprise: a breather line in fluid communication with the plenum at a first end and to atmosphere at a second end.

A further embodiment of any of the foregoing buffer assemblies, wherein the bearing compartment assembly can further comprise: a check valve positioned between the first end and the second end of the breather line, the check valve configured to allow flow from the plenum to atmosphere.

A further embodiment of any of the foregoing buffer assemblies, wherein a gas turbine engine can comprise: the bearing compartment of claim 1; a stationary component; a rotating component; and wherein the bearing can be positioned between the stationary component and the rotating component; and wherein the reactive volume vessel can be positioned exterior to the bearing compartment in an upper half of the gas turbine engine.

A method of operating a bearing compartment assembly according to an exemplary embodiment of this disclosure, among other possible things includes: pressurizing an exterior of the bearing compartment to a buffer pressure with a first value using a buffer system; pressurizing a plenum inside a bearing compartment to a plenum pressure with a second value; changing the buffer pressure to a third value; changing the plenum pressure to a fourth value; and increasing a volume of the plenum to decrease the plenum pressure to prevent the buffer pressure from decreasing below the plenum pressure.

The method of the preceding paragraph can optionally include, additionally and/or alternatively, any one or more of the following features, configurations and/or additional components:

A further embodiment of the foregoing method, wherein the first value can be greater than the second value by a first difference.

A further embodiment of any of the foregoing methods, wherein the third value can be greater than the fourth value by a second difference that is lesser than the first difference.

A further embodiment of any of the foregoing methods, wherein the first value can be greater than the third value, and the second value is greater than the fourth value.

A further embodiment of any of the foregoing methods, wherein after increasing the volume of the plenum the method can further comprise: changing the buffer pressure to a fifth value; changing the plenum pressure to a sixth value that is lesser than the fifth value by a third difference that is greater than the second difference; and decreasing the volume of the plenum.

A further embodiment of any of the foregoing methods, wherein increasing the volume of the plenum can comprise: moving a displaceable member that is in fluid communication with the plenum from a standard volume position to an additional volume position.

A further embodiment of any of the foregoing methods, wherein moving the displaceable member can comprise: exerting force from an elastic member on the displaceable member that biases the displaceable member into the additional volume position.

A reactive volume vessel according to an exemplary embodiment of this disclosure, among other possible things includes: a housing with a cavity comprising: a first port configured to be in fluid communication with a bearing compartment of a gas turbine engine; and a second port configured to be in fluid communication with a buffer system of the gas turbine engine; a displaceable member positioned in the cavity, the displaceable member being positionable in a standard volume position and an additional volume position wherein the additional volume position augments a volume of the bearing compartment; and an elastic member that biases the displaceable member in the additional volume position.

The reactive volume vessel of the preceding paragraph can optionally include, additionally and/or alternatively, any one or more of the following features, configurations and/or additional components:

A further embodiment of the foregoing reactive volume vessel, wherein the displaceable member can be a piston that is fluidly exposed the bearing compartment on a first side and is fluidly exposed to the buffer system on a second side, wherein a first surface area on the first side is equal to a second surface area on the second side.

A further embodiment of any of the foregoing reactive volume vessels, wherein the elastic member can be a spring.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing compartment assembly comprising:
   a bearing compartment comprising:
      a bearing;
      a plenum surrounding the bearing, the plenum having a plenum volume;
   a buffer system that supplies pressurized air to an exterior of the bearing compartment to provide a buffer pressure that discourages leakage of oil from the bearing compartment when the buffer pressure exceeds a bearing compartment pressure within the bearing compartment; and
   a reactive volume vessel that is in fluid communication with the plenum and with the buffer system, the reactive volume vessel comprising a housing with a cavity and a displaceable member that is movable within the cavity between a standard volume position and a maximum additional volume position in response to a pressure differential between the buffer pressure and the bearing compartment pressure to define a variable additional volume that is in fluid communication with the plenum volume, wherein, during a transition period when buffer pressure is decreasing, the displaceable member moves so that the reactive volume vessel adds the variable additional volume to the plenum volume to decrease bearing compartment pressure at a rate that is similar to or faster than a rate of decrease of the buffer pressure and thereby maintains the pressure differential positive during the transition period.

2. The bearing compartment assembly of claim 1, wherein a first side of the displaceable member is fluidly exposed to the plenum and a second side of the displaceable member is fluidly exposed to the buffer system.

3. The bearing compartment assembly of claim 1, further comprising:
   an elastic member that biases the displaceable member toward the maximum additional volume position.

4. The bearing compartment assembly of claim 1, wherein the displaceable member is a piston.

5. The bearing compartment assembly of claim 4, further comprising:
   a seal positioned between the piston and a housing of the reactive volume vessel.

6. The bearing compartment assembly of claim 4, further comprising:
   a spring that biases the piston toward the maximum additional volume position.

7. The bearing compartment assembly of claim 1, further comprising:
   a breather line in fluid communication with the plenum at a first end and to atmosphere at a second end.

8. The bearing compartment assembly of claim 7, further comprising:

a check valve positioned between the first end and the second end of the breather line, the check valve configured to allow flow from the plenum to atmosphere.

9. A gas turbine engine comprising:
the bearing compartment assembly of claim 1;
a stationary component;
a rotating component; and
wherein the bearing is positioned between the stationary component and the rotating component; and
wherein the reactive volume vessel is positioned exterior to the bearing compartment in the gas turbine engine so that oil deposited in the reactive volume vessel from an air/oil mixture inside the bearing compartment will drain out of the reactive volume vessel to the bearing compartment during and after shutdown of the gas turbine engine.

10. A reactive volume vessel comprising:
a housing with a cavity comprising:
a first port configured to be in fluid communication with a bearing compartment of a gas turbine engine; and
a second port configured to be in fluid communication with a buffer system of the gas turbine engine;
a displaceable member positioned in the cavity, the displaceable member being positionable, based upon a pressure differential between a bearing compartment pressure at the first port and a buffer pressure at the second port, between a standard volume position and a maximum additional volume position to define a variable additional volume that augments a volume of the bearing compartment; wherein during a transition period when the buffer pressure is decreasing, the displaceable member moves so that the reactive volume vessel adds the variable additional volume to the volume of the bearing compartment to decrease bearing compartment pressure at a rate that is similar to or faster than a rate of decrease of the buffer pressure and thereby maintains the pressure differential positive during the transition period; and
an elastic member that biases the displaceable member in the additional volume position.

11. The reactive volume vessel of claim 10, wherein the displaceable member is a piston that is fluidly exposed to the bearing compartment on a first side and is fluidly exposed to the buffer system on a second side, wherein a first surface area on the first side is equal to a second surface area on the second side.

12. The reactive volume vessel of claim 10, wherein the elastic member is a spring.

* * * * *